United States Patent
Solihin

(10) Patent No.: US 9,465,729 B2
(45) Date of Patent: Oct. 11, 2016

(54) MEMORY ALLOCATION ACCELERATOR

(71) Applicant: EMPIRE TECHNOLOGY DEVELOPMENT LLC, Wilmington, DE (US)

(72) Inventor: Yan Solihin, Raleigh, NC (US)

(73) Assignee: Empire Technology Development LLC, Wilmington, DE (US)

( * ) Notice: Subject to any disclaimer, the term of this patent is extended or adjusted under 35 U.S.C. 154(b) by 157 days.

(21) Appl. No.: 13/982,807

(22) PCT Filed: Mar. 13, 2013

(86) PCT No.: PCT/US2013/030876
§ 371 (c)(1),
(2) Date: Jul. 31, 2013

(87) PCT Pub. No.: WO2014/142836
PCT Pub. Date: Sep. 18, 2014

(65) Prior Publication Data
US 2014/0281336 A1    Sep. 18, 2014

(51) Int. Cl.
*G06F 3/00* (2006.01)
*G06F 12/00* (2006.01)
*G06F 12/02* (2006.01)

(52) U.S. Cl.
CPC ......... *G06F 12/0223* (2013.01); *G06F 12/023* (2013.01)

(58) Field of Classification Search
None
See application file for complete search history.

(56) References Cited

U.S. PATENT DOCUMENTS

| | | | | |
|---|---|---|---|---|
| 5,930,827 | A | * | 7/1999 | Sturges .................... 711/170 |
| 6,983,357 | B2 | | 1/2006 | Poff et al. |
| 7,334,104 | B2 | * | 2/2008 | Piper et al. .................... 711/170 |
| 7,458,078 | B2 | * | 11/2008 | DeWitt et al. ................ 718/104 |
| 2004/0123096 | A1 | * | 6/2004 | Buer et al. .................... 713/153 |
| 2006/0069898 | A1 | * | 3/2006 | Patel et al. .................... 711/171 |
| 2011/0145447 | A1 | | 6/2011 | Dimond |
| 2011/0153690 | A1 | | 6/2011 | Allen et al. |
| 2012/0131283 | A1 | * | 5/2012 | Mital et al. ................... 711/144 |
| 2013/0311738 | A1 | * | 11/2013 | Jiang .................. G06F 12/1466 711/163 |
| 2014/0089625 | A1 | * | 3/2014 | Assarpour ...................... 711/170 |

OTHER PUBLICATIONS

Borkar, S. and A. A. Chien, "The Future of Microprocessors", Communications of the ACM, May 2011, pp. 67-77, vol. 54 No. 5.
Hameed, R. et al., "Understanding Sources of Inefficiency in General-Purpose Chips," Proceedings of the 37th Intl. Symposium on Computer Architecture (ISCA), Jun. 2010, 85-93.

(Continued)

*Primary Examiner* — David E Martinez
(74) *Attorney, Agent, or Firm* — Moritt Hack & Hamroff LLP; Steven S. Rubin, Esq.

(57) ABSTRACT

Technologies are generally described for methods and systems effective to implement a memory allocation accelerator. A processor may generate a request for allocation of a requested chunk of memory. The request may be received by a memory allocation accelerator configured to be in communication with the processor. The memory allocation accelerator may process the request to identify an address for a particular chunk of memory corresponding to the request and may return the address to the processor.

22 Claims, 6 Drawing Sheets

(56) References Cited

OTHER PUBLICATIONS

Tiwari, D. et al., MMT:Exploiting Fine-Grained Parallelism in Dynamic Memory Management Proc. of 24th International Parallel & Distributed Processing Symposium (IPDPS)Track-Software, Apr. 2010, 1-12.

Kharbutli, M. et al., "Comprehensively and Efficiently Protecting the Heap", Proc of International Symposium for Programming Languages and Operating Systems (ASPLOS), San Jose, Oct. 2006, 12 pages.

Memory Management Technique Speeds Apps by 20%, Slashdot, 2013, retrieved from http://developers.slashdot.org/story/10/04/05/2342205/memory-management-technique-speeds-apps-by-20, 22 pages.

Herrmann, E. C. and P. A. Wilsey, "Threaded Dynamic Memory Management in Many-Core Processors", In proceeding of: CISIS 2010, The Fourth International Conference on Complex, Intelligent and Software Intensive Systems, Jan. 2010, 6 pages.

Joao, J. A. et al., "Flexible Reference-Counting-Based Hardware Acceleration for Garbage Collection", ISCA'09, Jun. 2009, 11 pages.

Shriraman, A. et al., "Hardware Acceleration of Software Transactional Memory", the First ACM SIGPLAN Workshop on Languages, Compilers, and Hardware Support for Transactional Computing, held in conjunction with PLDI, Ottawa, Ontario, Canada,, Jun. 2006, p. 1-10.

Shalan, M. and V. J. Mooney III, "A Dynamic Memory Management Unit for Embedded Real-Time System-on-a-Chip", Proceedings of the 2000 international conference on Compilers, architecture, and synthesis for embedded systems, 2000, pp. 180-186.

Auras, D. et al., "CMA: Chip Multi-Accelerator", 2010 IEEE 8th Symposium on Application Specific Processors (SASP) Jun. 13-14, 2010, pp. 8-15.

International Search Report and Written Opinion for PCT application with application No. PCT/US2013/030876, dated May 20, 2013, 11 pages.

* cited by examiner

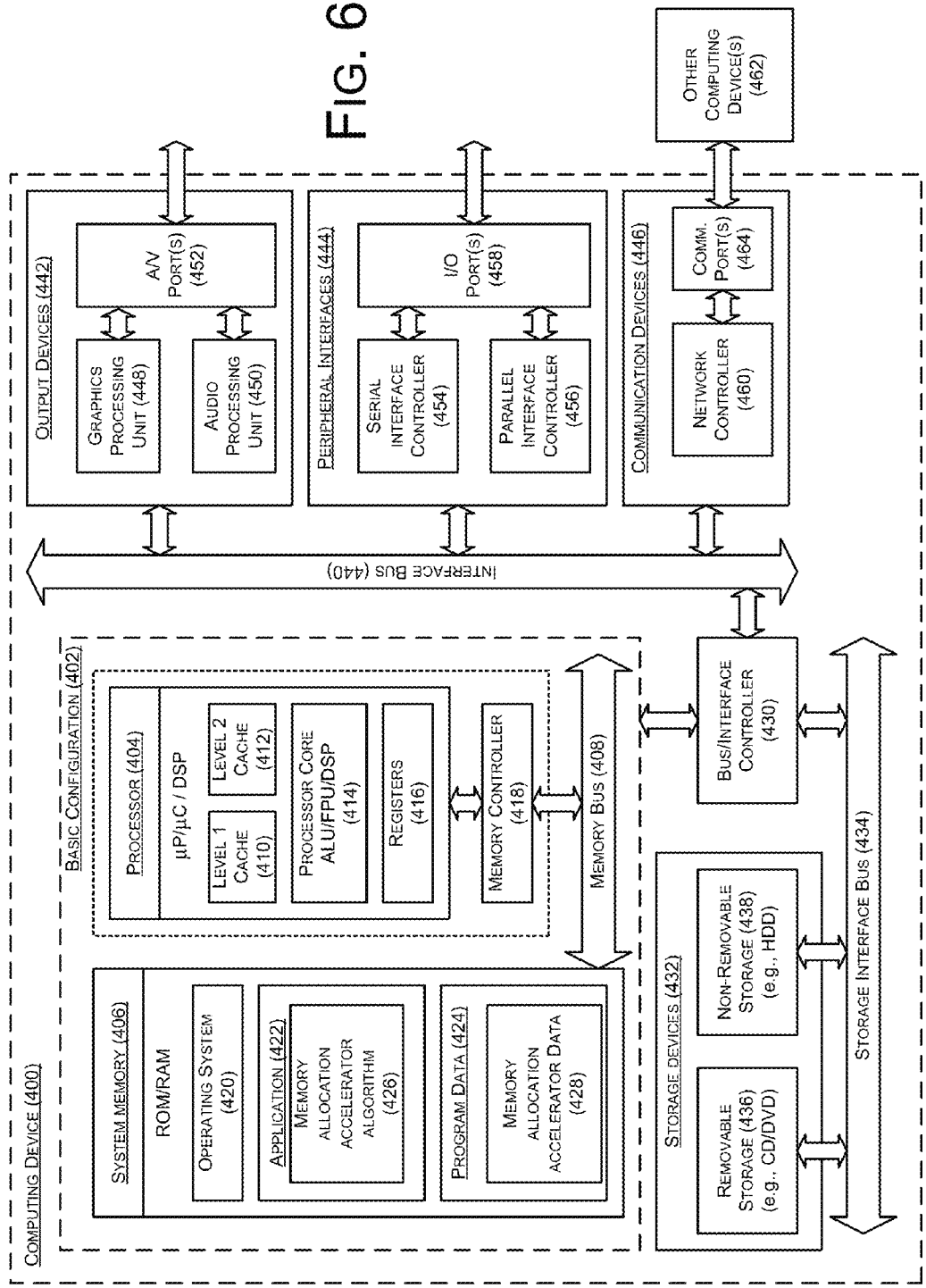

MEMORY ALLOCATION ACCELERATOR

CROSS REFERENCE TO RELATED APPLICATION

This application is a U.S. national stage filing under 35 U.S.C. 371 of International Application No. PCT/US2013/030876 filed Mar. 13, 2013, the entirety of which is hereby incorporated by reference.

BACKGROUND

Unless otherwise indicated herein, the materials and terms described in this section are not prior art to the claims in this application and are not admitted to be prior art by inclusion in this section.

In multi-core architectures, multiple processor cores may be included in a single integrated circuit die or on multiple integrated circuit dies that are arranged in a single chip package. A cache may be used to store data for access by one or more of the processor cores. The data can be a subset of data stored in a larger memory that may be typically located outside of the die. Each core may be provided with a cache that stores data for the core.

SUMMARY

In some examples, methods for allocating memory for a processor are generally described. The methods may include generating a request for allocation of a requested chunk of memory by the processor. The methods may further include receiving the request by a memory allocation accelerator configured to be in communication with the processor. The methods may include processing the request by the memory allocation accelerator to identify an address for a particular chunk of memory corresponding to the request. The methods may further include returning the address by the memory allocation accelerator to the processor.

In some examples, tiles may include a processor core, a cache and a memory allocation accelerator configured to be in communication with the core and the cache. The processor may be configured to generate a request for allocation of a requested chunk of memory by the processor. The memory allocation accelerator may be configured to receive the request. The memory allocation accelerator may be configured to process the request to identify an address for a particular chunk of memory corresponding to the request. The memory allocation accelerator may be configured to return the address to the processor.

In some examples, memory allocation accelerators may include a memory and a controller configured in communication with the memory. The controller may be configured to receive a request for allocation of a requested chunk of memory. The controller may be configured to process the request to identify an address for a particular chunk of memory corresponding to the request. The controller may be configured to return the address.

The foregoing summary is illustrative only and is not intended to be in any way limiting. In addition to the illustrative aspects, embodiments, terms, and features described above, further aspects, embodiments, terms, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 6 is a block diagram illustrating an example computing device that is arranged to implement a memory allocation accelerator, all arranged according to at least some embodiments described herein.

DETAILED DESCRIPTION

Figure 1:
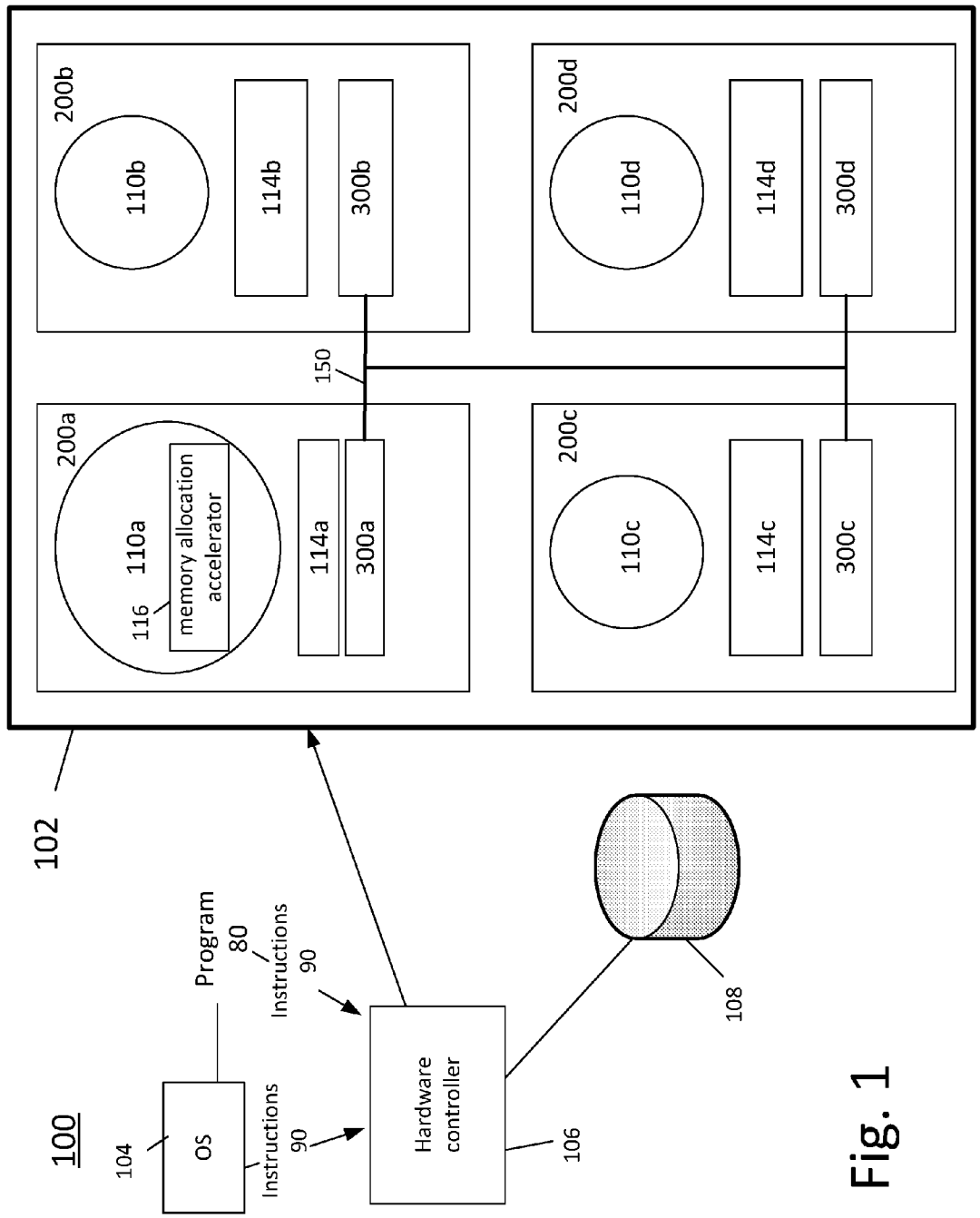
FIG. 1 illustrates an example system that can be utilized to implement a memory allocation accelerator.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure is generally drawn, inter alia, to methods, apparatus, systems, devices, and computer program products related to a memory allocation accelerator.

Briefly stated technologies are generally described for methods and systems effective to implement a memory allocation accelerator. A processor may generate a request for allocation of a requested chunk of memory. The request may be received by a memory allocation accelerator configured to be in communication with the processor. The memory allocation accelerator may process the request to identify an address for a particular chunk of memory corresponding to the request and may return the address to the processor.

FIG. 1 illustrates an example system that can be utilized to implement a memory allocation accelerator arranged in accordance with at least some embodiments described herein. An example system 100 may include a die 102, a hardware controller 106, and/or a memory 108, all of which may be configured in communication with each other. Hardware controller 106, and/or memory 108 may be physically located outside of die 102. Die 102 may include tiles 200 including tiles 200a, 200b, 200c, and/or 200d. Tiles 200 may include processor cores (herein "core" or "processor" or "processor core") 110 (including cores 110a, 110b, 110c, 110d), caches 114 (including caches 114a, 114b, 114c and/or 114*d*) and/or routers 300 (including routers 300*a*, 300*b*, 300*c*, and/or 300*d*). Routers 300 may be configured in communication through a network 150. Caches 114 may be, for example, L2 or L3 caches.

Tile 200*a* may include core 110*a*, cache 114*a*, and/or router 300*a*. Tile 200*b* may include core 110*b*, cache 114*b*, and/or router 300*b*. Tile 200*c* may include core 110*c*, cache 114*c*, and/or router 300*c*. Tile 200*d* may include core 110*d*, cache 114*d*, and/or router 300*d*.

Hardware controller 106 may be configured to receive instructions 90 from a program 80 or an operating system 104. Instructions 90 may relate to execution of a program 80. In response to instructions 90, hardware controller 106 may select one or more tiles 200 in die 102 to execute program 80.

One or more cores 110 may include a memory allocation accelerator. Focusing on core 110*a* as illustrative, core 110*a* may include a memory allocation accelerator 116. Memory allocation accelerator 116 may be configured to be in communication with core 110*a* and may be a functional unit of core 110*a*.

As discussed in more detail below, memory allocation accelerator 116 may be a hardware implemented functional unit focused on performance of a particular function. Memory allocation accelerator 116 may be focused on the function of allocating memory for use by core 110*a*. Core 110*a* may, for example, request an allocation of a chunk of memory from memory 108. The request for allocation of memory may be received and processed by memory allocation accelerator 116. Memory allocation accelerator 116 may identify a starting address for a chunk of memory corresponding to the request. In response to the request, memory allocation accelerator 116 may allocate a chunk of memory to core 110*a*. Memory allocation accelerator 116 may provide, to core 110*a*, an address of the starting location of the chunk of memory allocated to core 110*a*. After allocation of the chunk of memory and providing the address, core 110*a* may continue processing program 80 using the chunk of memory.

Figure 2:
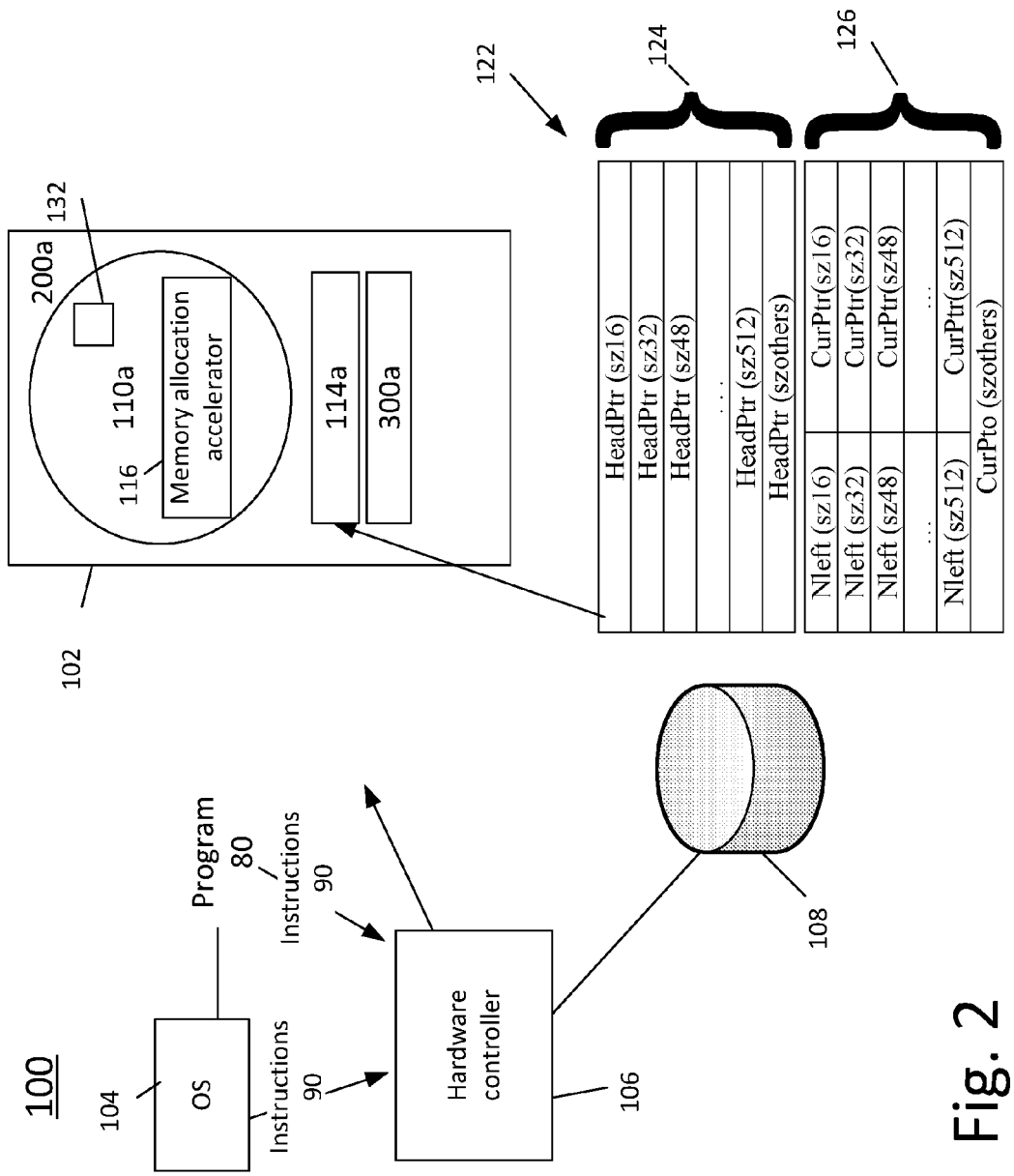
FIG. 2 illustrates the example system that can be utilized to implement the memory allocation accelerator of FIG. 1 showing additional details relating to metadata that may be used.

FIG. 2 illustrates the example system that can be utilized to implement the memory allocation accelerator of FIG. 1 showing additional details relating to metadata that may be used arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity.

Memory allocation accelerator 116 may store and maintain a metadata table 122. Metadata table 122 may be used to keep track of addresses to be allocated to processor 110*a*. Metadata table 122 may be stored in, for example, cache 114*a* starting at an allocated address (discussed below). The addresses of metadata 122 may be stored in connection with a fixed address region of processes executed by processor 110*a*. For example, the first page of a heap used by program 80 may be reserved as the addresses where metadata 122 may be stored. In another example, processor 110*a* may include a register 132 used to store the starting address or addresses of metadata 122. As contexts or programs switch in processor 110*a*, the processor state of core 110*a*, including the address of metadata table 122, may be maintained in register 132 in core 110*a*.

Metadata table 122 may include a free list 124 and/or a pool list 126. Free list 124 may include identifications of memory chunks that have been recently made available. For example, a chunk of memory identified in free list 124 may be currently stored in cache 114*a* but have been de-allocated. These chunks of memory can be reused quickly and such a reuse may avoid the occurrence of a cache miss. Recycling de-allocated chunks may exploit temporal locality because the recycled chunks can be recycled quickly. Pool list 126 may include identifications of addresses in memory 108 where new memory chunks are available to be allocated. Pool list 126 may include bins including chunks of memory of various sizes. For example bins may include chunks with sizes that are multiples of 8 or 16 bytes (multiples of 16 bytes are shown in FIG. 2). Pool list 126 may help exploit allocation of spatial patterns of similar sized chunks. Pool list 126 may also include a number of chunks left field "Nleft". Number of chunks left field Nleft may indicate a number of chunks available in the pool of the indicated chunk size.

Free list 124 may be configured to store pointers to the starting address ("HeadPtr") of chunks of memory of an indicated size. For example, free list 124 may include a pointer to the start address of a chunk of memory that is 16 bytes in size ("sz16"). Similarly, free list 124 may include a pointer to the start address of a chunk of memory that is 32 bytes ("sz32"), 48 ("sz48") or 512 ("sz512") bytes in size.

Pool list 126 may store a current pointer ("CurPtr") adapted to point to the current starting address of chunks of memory of an indicated size. Pool list 126 may include pointers to pre-allocated chunks of a pool. A pool may be a contiguous memory address range with uniformly sized chunks in memory 108. Chunks from a pool may be allocated by identifying a value of a current pointer pointing to the beginning of the chunk. Memory allocation accelerator 116 may return the value of the address at the beginning of the chunk to core 110*a*. Memory allocation accelerator 116 may then increment the address of the pointer by the size of the chunk to point to a new address in memory 108. For example, pool list 126 may include pointers adapted to point to the start addresses of chunks of memory that are 16 bytes in size. Similarly, pool list 126 may include pointers adapted to point to the start addresses of chunks of memory that are 32, 48 or 512 bytes in size.

In an example, memory allocation accelerator 116 may be assigned, or may request, a page in memory 108. Memory allocation accelerator 116 may then allocate chunks of memory space in that page in various sizes that are multiples of 8 bytes. In pool list 126, the current pointer CurPtr may point to a starting address of one of the chunks of memory available in memory 108. In examples when core 110 requests allocation of a chunk of memory, memory allocation accelerator 116 may return the address identified in pointer CurPtr in response. As chunks of memory are allocated to core 110, current pointer CurPtr may be updated to reflect the next address where a chunk of memory is available.

A number of chunks left "Nleft" field may store an indication of a number of chunks of a particular size still available in the pool in pool list 126. For example, if 5 blocks of 16 byte chunks are available, a "Nleft (sz 16)" field may indicate the number 5. As chunks of memory are allocated, number of chunks left "Nleft" field may be decremented in value by memory allocation accelerator 110.

In an example, program 80 may be executed by core 110. Program 80 may request allocation of 16 bytes of memory. The request may be sent to memory allocation accelerator 116 as a functional unit of core 110. Memory allocation accelerator 116 may first analyze free list 124 to determine whether a chunk of 16 bytes is available in memory 108. If the chunk of 16 bytes is indicated as being available in free list 124, memory allocation accelerator 116 may return the corresponding starting address of the chunk identified in the HeadPtr field. If the chunk of 16 bytes is not indicated as being available in free list 124, memory allocation accelerator 116 may analyze pool list 126. If a chunk of 16 bytes is indicated as being available in pool list 126, memory allocation accelerator 116 may return the corresponding address identified in the current pointer CurPtr field. Memory allocation accelerator 116 may further decrement number of chunks left field Nleft to indicate that one less chunk of 16 bytes is available. Memory allocation accelerator 116 may further increment current pointer field CurPtr by the size of the memory chunk—in the example by 16 bytes. If the pool list does not include an indication of a chunk of 16 bytes, memory allocation accelerator 116 may generate an exception handler and may retry the request after the exception handling is completed.

In an example, program 80 may be executed by core 110. Program 80 may generate a de-allocation request that requests de-allocation of a chunk of 16 or other number of bytes of memory. The de-allocation request may be sent to memory allocation accelerator 116 as a functional unit of core 110. Memory allocation accelerator 116 may update free list 124 by updating the HeadPtr field to point to the newly de-allocated chunk. The newly de-allocated chunk may be updated to include a pointer that points to the chunk that was referenced in the HeadPtr field before the HeadPtr field was updated.

Below is an example of pseudo code which could be used to implement a memory allocation by memory allocation accelerator 116 as explained in detail above.

```
(void*) malloc(int size)
{
   void* freelistAddr, poolAddr, chunkAddr;
   if (size <= 512) {
      size = roundUp(size);              // round up to nearest
                                         16 increments
      freelistAddr = calculate_freelist_address(MetaDataAddress, size);
      poolAddr = calcalate_pool_address(MetaDataAddress, size);
      if (freelistAddr->BeadPtr != NULL) {    // allocate from free list
         chunkAddr = freelistAddr->HeadPtr;
         freeListAddr->HeadPtr = freeListAddr->HeadPtr->next;
      }
      else {
         if {poolAddr->Nleft == 0)          // pool runs out of chunks
            allocate_new_pool(size);
         chunkAddr = poolAddr->CurPtr;
         poolAddr->CurPtr = poolAddr->CurPtr + size; // increment CurPtr
         poolAddr->Nleft = poolAddr->Nleft - 1; // decrement num chunks
      }
   else {
      freelistAddr = calculate_other_freelist_address(MetaDataAddress;
      poolAddr = calculate_other_pool_address(MetaDataAddress};
      chunkAddr = searchBestFit(freeListAddr);
      if (chunkAddr == NULL)
         chunkAddr = allocate_individual_chunk(poolAddr);
   }
   return chunkAddr;
}
```

Metadata 122 may be stored in a tag-less format as shown in FIG. 2. In the tag-less format, bit manipulation may be used to index data. Bit manipulation may include shifting some number of bit positions and masking bits of interest by using bit-wise AND or OR operations. In the tag-less format, comparisons need not be performed and analysis of metadata 122 may be relatively simpler and faster than if a tag-ed format were used. In other examples, metadata 122 may be indexed in other formats as desired.

Figure 3:
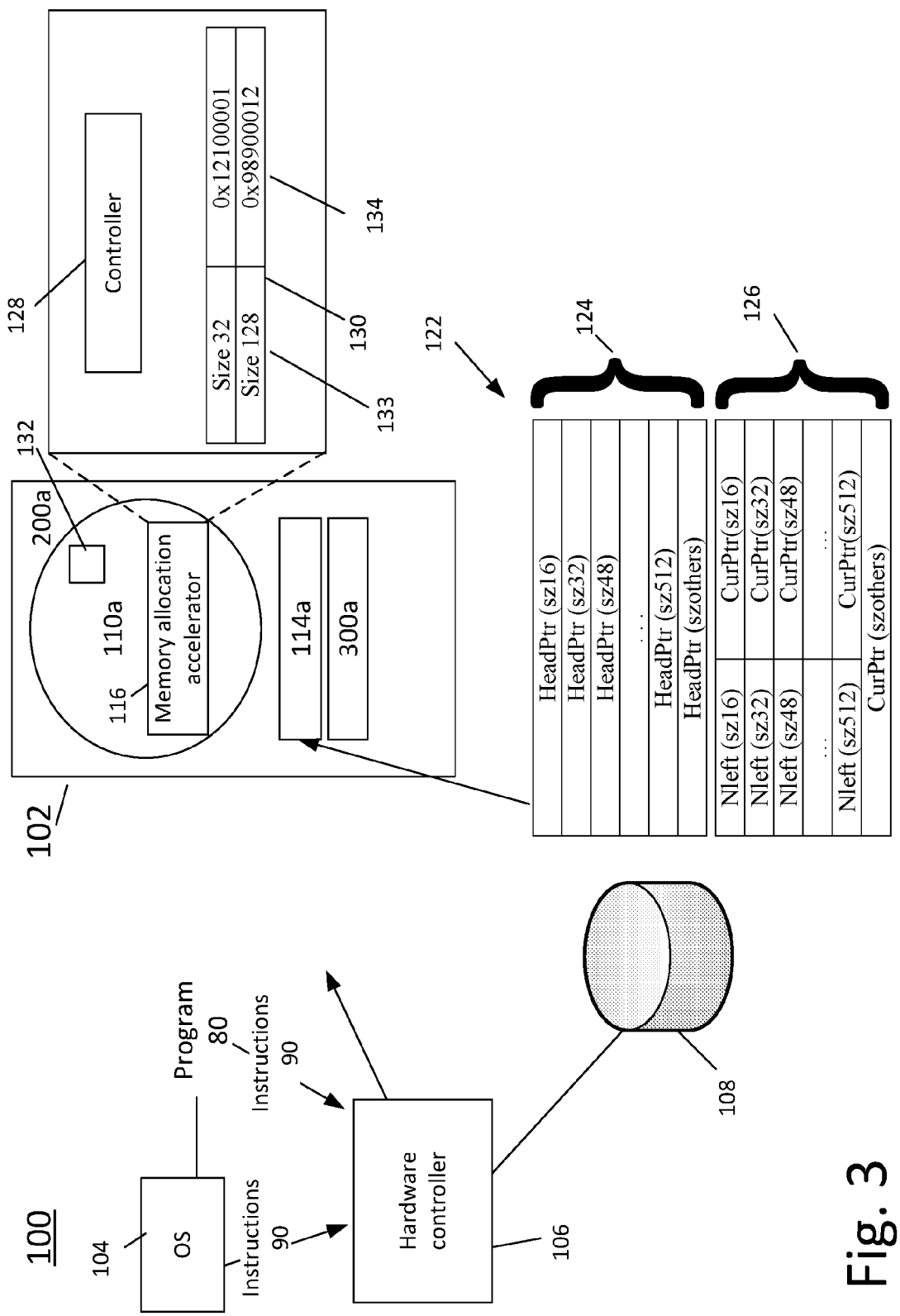
FIG. 3 illustrates the example system that can be utilized to implement the memory allocation accelerator of FIG. 2 showing additional details including a pre-allocation table.

FIG. 3 illustrates the example system that can be utilized to implement a memory allocation accelerator of FIG. 2 showing additional details including a pre-allocation table arranged in accordance with at least some embodiments described herein. FIG. 3 is substantially similar to system 100 of FIGS. 1 and 2, with additional details. Those components in FIG. 3 that are labeled identically to components of FIGS. 1 and 2 will not be described again for the purposes of clarity.

Memory allocation accelerator may include a controller 128 and/or a pre-allocation table 130. Pre-allocation table 130 may be a hardware structure that is relatively small compared to memory 108 and may be disposed so that pre-allocation table 130 can be accessed with a low latency by the memory allocation accelerator 116. Pre-allocation table 130 may include a chunk size field 133 and/or a pointer field 134. To further accelerate memory allocation, memory allocation accelerator 116 may populate pre-allocation table 130. Pre-allocation table 130 may be a hardware structure inside memory allocation accelerator 116. Memory allocation accelerator 116 may pre-allocate chunks of memory even before processor 110a issues requests for the chunks. For example, memory allocation accelerator 116 may identify certain chunk sizes that have been historically requested by processor 110a. Memory allocation accelerator 116 may then pre-allocate chunks of memory in those sizes and store pointers for the pre-allocated chunks in pre-allocation table 130. In another example, memory allocation accelerator may pre-allocate chunks of memory of some or all available sizes in pre-allocation table 130. Controller 128 may allocate more than one entry for certain sized chunks. Controller 128 may identify chunk sizes that are frequently requested and prioritize in keeping those frequently requested chunk sizes in pre-allocation table 130.

In an example, core 110 may request allocation of a 32 byte chunk of memory. Controller 128 of memory allocation accelerator 116 may analyze data in pre-allocation table 130 to determine if a pointer corresponding to a 32 byte chunk has been stored. If the chunk has been pre-allocated, controller 128 may identify the corresponding pointer and return the corresponding address to processor 110. The corresponding pointer has now been consumed and controller 128 may identify a new pointer in metadata 122. The new pointer may be identified in metadata 122 and stored in pointer field 134 of pre-allocation table 130. A corresponding current pointer value HeadPtr or CurPtr in metadata 122 may be updated and number of chunks left value Nleft may be decremented.

In an example, core 110a may request allocation of a 16 byte chunk of memory. Controller 128 of memory allocation accelerator 116 may analyze pre-allocation table 130 to determine if a 16 byte chunk has been pre-allocated. If the chunk has not been pre-allocated, controller 128 may analyze free list 124 and pool list 126 of metadata 122 for a chunk. If a chunk is identified in metadata 122, the corresponding address may be returned to processor 110. A corresponding current pointer CurPtr value may be updated and number of chunks left Nleft value may be decremented. In another example, if the 16 byte chunk has not been pre-allocated, but a 32 byte chunk has been pre-allocated, controller 128 may return an address for the 32 byte chunk. Controller 128 may then evict an entry in pre-allocation table 130 and enter an entry for a 16 byte chunk in anticipation of future requests.

The tables below illustrate some experimental data relating to some of the example systems disclosed herein.

| Memory allocation application | Allocation time (percentage of execution time) | Execution time | Increased speed |
|---|---|---|---|
| Without disclosed system | 30% | 100% | 1.0x |
| Disclosed system without Pre-allocation table | 11.4% | 81.4% | 1.23x |
| Disclosed system with pre-allocation table | 2.5% | 72.5% | 1.38x |

| Server application | Allocation time (percentage of execution time) | Execution time | Increased speed |
|---|---|---|---|
| Without disclosed system | 15% | 100% | 1.0x |
| Disclosed system without Pre-allocation table | 5.7% | 90.7% | 1.1x |
| Disclosed system with pre-allocation table | 1.3% | 86.3% | 1.16x |

Among other possible benefits, a system in accordance with the disclosure may be able to accelerate memory allocation. Programs using heap memory, such as C and C++, where objects are allocated with calls to a memory allocation library may benefit from the disclosed system. Memory allocation may contribute significant execution time, and may benefit from the described systems. As a single instruction and a simple table lookup may be used to allocate or de-allocate memory instead of perhaps hundreds of dynamic instructions, energy efficiency may be improved. Similar memory allocation calls as those used in a library call may be used.

Figure 4:
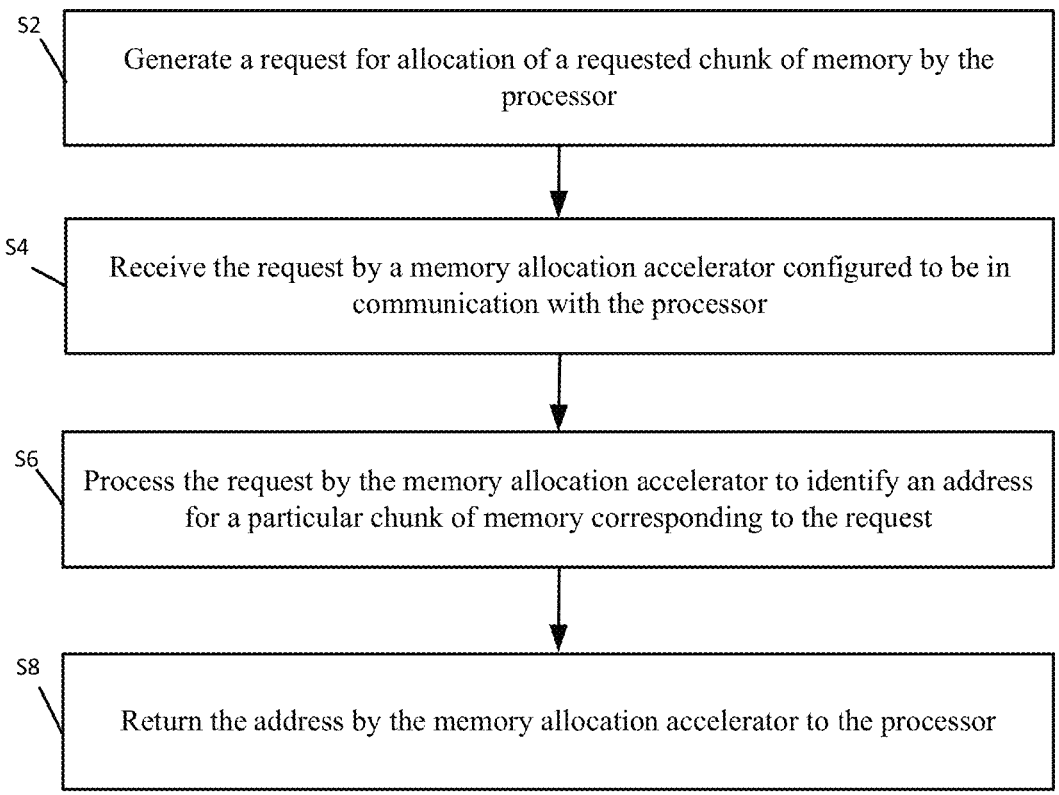
FIG. 4 depicts a flow diagram for an example process for implementing a memory allocation accelerator.

FIG. 4 depicts a flow diagram for an example process for allocating memory for a processor arranged in accordance with at least some embodiments described herein. In some examples, the process in FIG. 4 could be implemented using system 100 discussed above.

An example process may include one or more operations, actions, or functions as illustrated by one or more of blocks S2, S4, S6 and/or S8. Although illustrated as discrete blocks, various blocks may be divided into additional blocks, combined into fewer blocks, or eliminated, depending on the desired implementation.

Processing may begin at block S2, "Generate a request for allocation of a requested chunk of memory by the processor." At block S2, a processor may be configured to generate a request for allocation of a requested chunk of memory. In some examples, pre-allocation data may be stored prior to generating the request. Processing may continue from block S2 to block S4, "Receive the request by a memory allocation accelerator configured to be in communication with the processor." At block S4, a memory allocation accelerator may be configured to receive the request.

Processing may also continue from block S4 to block S6, "Process the request by the memory allocation accelerator to identify an address for a particular chunk of memory corresponding to the request." At block S6, the memory allocation accelerator may be configured to identify an address for a particular chunk of memory corresponding to the request.

Processing may continue from block S6 to block S8, "Return the address by the memory allocation accelerator to the processor." At block S8, the memory allocation accelerator may return the address corresponding to the chunk of memory. The memory allocation accelerator may further store metadata relating to memory available to be allocated for the processor. The metadata may include starting addresses in a free list and pointers to starting addresses in a pool list. The free list may identify de-allocated chunks of memory stored in a cache. The pool list may identify chunks of memory in a pool.

When processing the request, the memory allocation accelerator may analyze the pointers in the free list to determine whether the pointers identify a responsive chunk responsive to the requested chunk. When the responsive chunk is not identified in the free list, the memory allocation accelerator may analyze the pointers in the pool list for a chunk responsive to the requested chunk. In response to returning the address, the memory allocation accelerator may move one of the pointers in the pool list to a different address based on the size of the particular chunk. The pool list may include a number of chunks available for allocation for respective chunk sizes. The memory allocation accelerator may decrement the number of chunks available for chunks of the size of the particular chunk. The processor may store an address for the metadata in a region related to a program executed by the processor or in a register of the processor. The pre-allocation data may be analyzed prior to analyzing the metadata.

Figure 5:
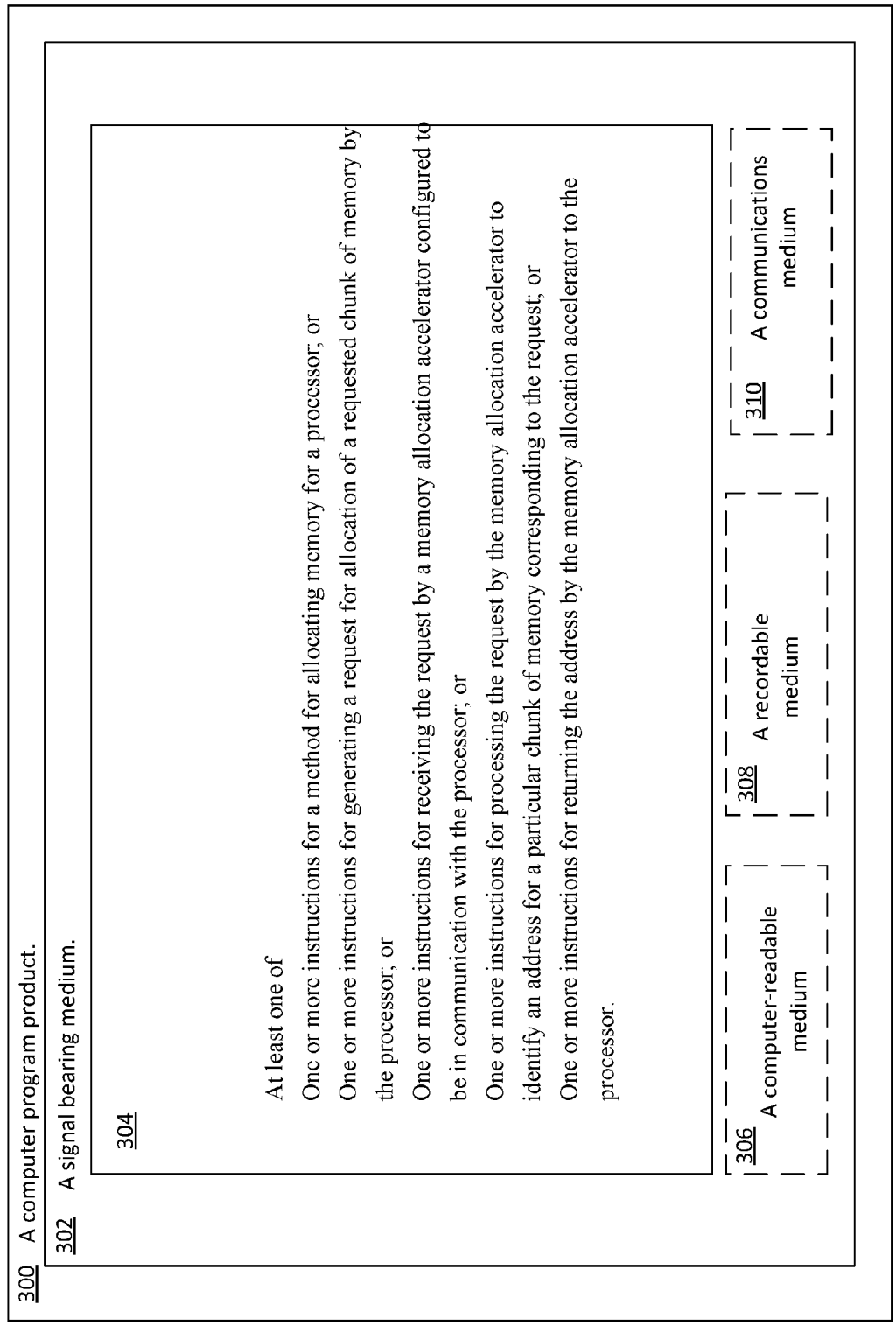
FIG. 5 illustrates a computer program product that can be utilized to implement a memory allocation accelerator.

FIG. 5 illustrates an example computer program product 300 that can be utilized to implement a memory allocation accelerator arranged in accordance with at least some embodiments described herein. Computer program product 300 may include a signal bearing medium 302. Signal bearing medium 302 may include one or more instructions 304 that, when executed by, for example, a processor, may provide the functionality described above with respect to FIGS. 1-4. Thus, for example, referring to system 100, processor 110a and/or memory allocation accelerator 116 may undertake one or more of the blocks shown in FIG. 5 in response to instructions 304 conveyed to the system 100 by signal bearing medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, computer program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

FIG. 6 is a block diagram illustrating an example computing device 400 that is arranged to implement a memory allocation accelerator arranged in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a memory allocation accelerator algorithm 426 that is arranged to perform the functions as described herein including those described with respect to system 100 of FIGS. 1-5. Program data 424 may include memory allocation accelerator data 428 that may be useful to implement a memory allocation accelerator as is described herein. In some embodiments, application 422 may be arranged to operate with program data 424 on operating system 420 such that a memory allocation accelerator may be provided. This described basic configuration 402 is illustrated in FIG. 6 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to allocate memory for a processor core in a particular housing among a plurality of processor cores in respective different housings in a die, wherein the plurality of processor cores include respective memory allocation accelerators, the method comprising:
   receiving, by a memory allocation accelerator configured to be in communication with a processor core, a request generated by the processor core for allocation of a requested available chunk of memory, wherein the memory allocation accelerator is a unit in the processor core, the processor core and the memory allocation accelerator are in the particular housing, and the memory allocation accelerator is configured to allocate memory for use by the processor core;
   processing the request, by the memory allocation accelerator, to identify an address for a particular available chunk of memory corresponding to the request; and
   returning the address, by the memory allocation accelerator, to the processor core.

2. The method of claim 1, further comprising storing, by the memory allocation accelerator, metadata relating to memory available to be allocated for the processor core.

3. The method of claim 1, further comprising storing, by the memory allocation accelerator, metadata relating to memory available to be allocated for the processor core, wherein the metadata includes pointers in a free list and pointers in a pool list, wherein the free list identifies de-allocated chunks of memory stored in a cache configured in communication with the processor core, and the pool list identifies available chunks of memory in a pool.

4. The method of claim 1, further comprising:
   storing, by the memory allocation accelerator, metadata relating to memory available to be allocated for the processor core, wherein the metadata includes pointers in a free list and pointers in a pool list, wherein the free list identifies de-allocated chunks of memory stored in a cache configured in communication with the processor core, and the pool list identifies available chunks of memory in a pool;
   wherein processing the request includes analyzing, by the memory allocation accelerator, the pointers in the free list, to determine whether the pointers in the free list identify a chunk that is responsive to the requested chunk; and
   in response to the responsive chunk not being identified in the free list, analyzing, by the memory allocation accelerator, the pointers in the pool list for a chunk that is responsive to the requested chunk.

5. The method of claim 1, further comprising storing, by the memory allocation accelerator, metadata relating to memory available to be allocated for the processor core, wherein the metadata includes pointers to starting addresses in a free list and pointers to starting addresses in a pool list, wherein the free list identifies de-allocated chunks of memory stored in a cache configured in communication with the processor core, and the pool list identifies available chunks of memory in a pool.

6. The method of claim 1, further comprising:
assigning a page in the memory to the memory allocation accelerator; and
determining available chunks in the page by the memory allocation accelerator.

7. The method of claim 1, further comprising:
storing, by the memory allocation accelerator, metadata relating to memory available to be allocated for the processor core, wherein the metadata includes pointers to starting addresses in a free list and pointers to starting addresses in a pool list, wherein the free list identifies de-allocated chunks of memory stored in a cache configured in communication with the processor core, and the pool list identifies available chunks of memory in a pool; and
in response to returning the address, moving one of the pointers in the pool list to a different address based on a size of the particular available chunk.

8. The method of claim 1, further comprising storing, by the memory allocation accelerator, metadata relating to memory available to be allocated for the processor core, wherein the metadata includes pointers to starting addresses in a free list and pointers to starting addresses in a pool list, wherein the free list identifies de-allocated chunks of memory stored in a cache configured in communication with the processor core, and the pool list identifies available chunks of memory in a pool; and
wherein the pool list includes indications of numbers of chunks available for allocation for respective chunk sizes.

9. The method of claim 1, further comprising storing, by the memory allocation accelerator, metadata relating to memory available to be allocated for the processor core, wherein the metadata includes pointers to starting addresses in a free list and pointers to starting addresses in a pool list, wherein the free list identifies de-allocated chunks of memory stored in a cache configured in communication with the processor core, and the pool list identifies available chunks of memory in a pool;
wherein the pool list includes indications of numbers of chunks available for allocation for respective chunk sizes;
and the method further comprises decrementing the number of chunks available for chunks of the size of the particular available chunk.

10. The method of claim 1, further comprising:
storing, by the memory allocation accelerator, metadata relating to memory available to be allocated for the processor core, wherein the metadata includes pointers to starting addresses in a free list and pointers to starting addresses in a pool list, wherein the free list identifies de-allocated chunks of memory stored in a cache configured in communication with the processor core, and the pool list identifies available chunks of memory in a pool; and
storing, by the processor core, an address for the metadata in a region related to a program executed by the processor core.

11. The method of claim 1, further comprising:
storing, by the memory allocation accelerator, metadata relating to memory available to be allocated for the processor core, wherein the metadata includes pointers to starting addresses in a free list and pointers to starting addresses in a pool list, wherein the free list identifies de-allocated chunks of memory stored in a cache configured in communication with the processor core, and the pool list identifies available chunks of memory in a pool; and
storing, by the processor core, an address for the metadata in a register of the processor core.

12. The method of claim 1, further comprising storing, by the memory allocation accelerator, a pointer to the available chunk of memory prior to generating the request.

13. The method of claim 1, further comprising:
storing, by the memory allocation accelerator, pre-allocation data prior to generating the request, the pre-allocation data including a pointer to the available chunk of memory;
storing, by the memory allocation accelerator, metadata relating to memory available to be allocated for the processor core, wherein the metadata includes pointers to starting addresses in a free list and pointers to starting addresses in a pool list, wherein the free list identifies de-allocated chunks of memory stored in a cache configured in communication with the processor core, and the pool list identifies available chunks of memory in a pool;
in response to the request, analyzing the pre-allocation data; and
in response to a pointer to a chunk that is responsive to the requested chunk not being in the pre-allocation data, searching the metadata for the pointer to the responsive chunk.

14. The method of claim 1, further comprising:
storing, by the memory allocation accelerator, pre-allocation data prior to generating the request, the pre-allocation data including a pointer to an available chunk of memory;
storing, by the memory allocation accelerator, metadata relating to memory available to be allocated for the processor core, wherein the metadata includes pointers to starting addresses in a free list and pointers to starting addresses in a pool list, wherein the free list identifies de-allocated chunks of memory stored in a cache configured in communication with the processor core, and the pool list identifies available chunks of memory in a pool;
in response to the request, analyzing the pre-allocation data;
in response to a pointer to a chunk that is responsive to the requested chunk being stored in the pre-allocation data, the method further comprises:
returning an address identified by the pointer corresponding to the responsive chunk;
identifying a new address in the metadata for a chunk size corresponding to the particular available chunk;
moving one of the pointers in the free list or pool list to a different address based on the chunk size; and
identifying in the metadata an available number of chunks of the chunk size.

15. The method of claim 1, further comprising:
storing, by the memory allocation accelerator, metadata relating to memory available to be allocated for the processor core, wherein the metadata includes pointers in a free list and pointers in a pool list, wherein the free list identifies de-allocated chunks of memory stored in a cache configured in communication with the processor core, and the pool list identifies available chunks of memory in a pool;
receiving, by the memory allocation accelerator, a de-allocation request for de-allocation of the requested chunk;

processing the de-allocation request by the memory allocation accelerator to update the free list to point to the requested chunk; and processing the de-allocation request by the memory allocation accelerator to update the requested chunk to point to a chunk referenced in the free list prior to the de-allocation request.

16. A tile among a plurality of tiles in a die, wherein the plurality of tiles correspond to a plurality of processor cores in respective housings, and the plurality of processor cores include respective memory allocation accelerators, the tile comprising:

a processor core in a particular housing; and a cache;

wherein the processor core comprises a memory allocation accelerator configured to be in communication with the cache, the memory allocation accelerator is a unit in the processor core, the processor core and the memory allocation accelerator are in the particular housing, the memory allocation accelerator is configured to allocate memory for use by the processor core;

the processor core is configured to generate a request for allocation of a requested available chunk of memory;

the memory allocation accelerator is configured to:

receive the request;

process the request to identify an address for a particular available chunk of memory corresponding to the request; and return the address by the memory allocation accelerator to the processor core.

17. The tile of claim 16, wherein the memory allocation accelerator is configured to store metadata, wherein the metadata relates to memory available to be allocated for the processor core, wherein the metadata includes pointers to starting addresses in a free list and pointers to starting addresses in a pool list, wherein the free list identifies de-allocated chunks of memory stored in a cache configured in communication with the processor core, and the pool list identifies available chunks of memory in a pool.

18. The tile of claim 16, wherein the memory allocation accelerator is further configured to store a pointer to an available chunk of memory prior to receipt of the request.

19. A memory allocation accelerator, comprising:

a memory;

a controller configured in communication with the memory, the controller configured to:

receive a request for allocation of a requested available chunk of the memory, wherein the request is generated by a processor core, the memory allocation accelerator is a unit in the processor core, the processor core and the memory allocation accelerator are in a particular housing, the memory allocation accelerator is configured to allocate memory for use by the processor core, the processor core in the particular housing is among a plurality of processor cores in respective housings in a die;

process the request to identify an address for a particular available chunk of the memory corresponding to the request; and return the address in response to the request.

20. The memory allocation accelerator of claim 19, wherein the controller is further configured to store metadata relating to memory available to be allocated for a processor core, wherein the metadata includes pointers to starting addresses in a free list and pointers to starting addresses in a pool list, wherein the free list identifies de-allocated chunks of the memory stored in a cache configured in communication with the processor core, and the pool list identifies available chunks of the memory in a pool.

21. A method to allocate memory for a processor core, the method comprising:

receiving, by a memory allocation accelerator configured to be in communication with a processor core, a request generated by the processor core for allocation of a requested available chunk of memory;

processing the request by the memory allocation accelerator to identify an address for a particular available chunk of memory corresponding to the request;

returning the address by the memory allocation accelerator to the processor core;

storing, by the memory allocation accelerator, pre-allocation data prior to generating the request, the pre-allocation data including a pointer to an available chunk of memory;

storing, by the memory allocation accelerator, metadata relating to memory available to be allocated for the processor core, wherein the metadata includes pointers to starting addresses in a free list and pointers to starting addresses in a pool list, wherein the free list identifies de-allocated chunks of memory stored in a cache configured in communication with the processor core, and the pool list identifies available chunks of memory in a pool;

in response to the request, analyzing, by the memory allocation accelerator, the pre-allocation data;

in response to a pointer to a chunk that is responsive to the requested chunk being stored in the pre-allocation data, the method further comprises:

returning, by the memory allocation accelerator, an address identified by the pointer corresponding to the responsive chunk;

identifying, by the memory allocation accelerator, a new address in the metadata for a chunk size corresponding to the particular available chunk;

moving, by the memory allocation accelerator, one of the pointers in the free list or pool list to a different address based on the chunk size; and identifying, by the memory allocation accelerator, in the metadata an available number of chunks of the chunk size.

22. A method to allocate memory for a processor core, the method comprising:

receiving, by a memory allocation accelerator configured to be in communication with a processor core, a request generated by the processor core for allocation of a requested available chunk of memory;

processing the request by the memory allocation accelerator to identify an address for a particular available chunk of memory corresponding to the request;

returning the address by the memory allocation accelerator to the processor core;

storing, by the memory allocation accelerator, metadata relating to memory available to be allocated for the processor core, wherein the metadata includes pointers in a free list and pointers in a pool list, wherein the free list identifies de-allocated chunks of memory stored in a cache configured in communication with the processor core, and the pool list identifies available chunks of memory in a pool;

receiving, by the memory allocation accelerator, a de-allocation request for de-allocation of the requested chunk;

processing the de-allocation request by the memory allocation accelerator to update the free list to point to the requested chunk; and processing the de-allocation request by the memory allocation accelerator to update the requested chunk to point to a chunk referenced in the free list prior to the de-allocation request.

* * * * *

UNITED STATES PATENT AND TRADEMARK OFFICE
CERTIFICATE OF CORRECTION

PATENT NO. : 9,465,729 B2  
APPLICATION NO. : 13/982807  
DATED : October 11, 2016  
INVENTOR(S) : Solihin It is certified that error appears in the above-identified patent and that said Letters Patent is hereby corrected as shown below:

On the Title Page

In Item (74), under "Attorney, Agent, or Firm", in Column 2, Lines 1-2, delete "Moritt Hack & Hamroff LLP;" and insert -- Moritt Hock & Hamroff LLP; --, therefor.

In the Specification

In Column 1, Line 7, delete "U.S.C. 371" and insert -- U.S.C. § 371 --, therefor.

In Column 5, Line 41, delete "calcalate" and insert -- calculate --, therefor.

Signed and Sealed this  
Seventh Day of March, 2017

Michelle K. Lee  
*Director of the United States Patent and Trademark Office*